April 10, 1956 E. MARGOLIN 2,741,027
INFANTS' SPOONS
Filed Sept. 28, 1953 2 Sheets-Sheet 2
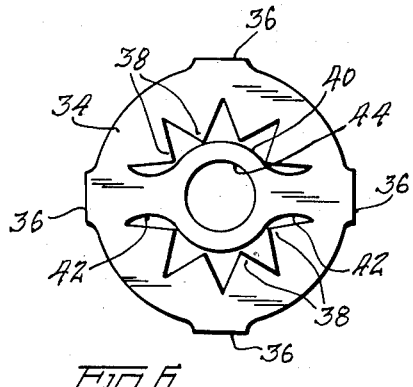
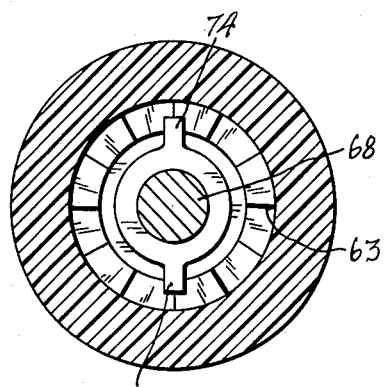
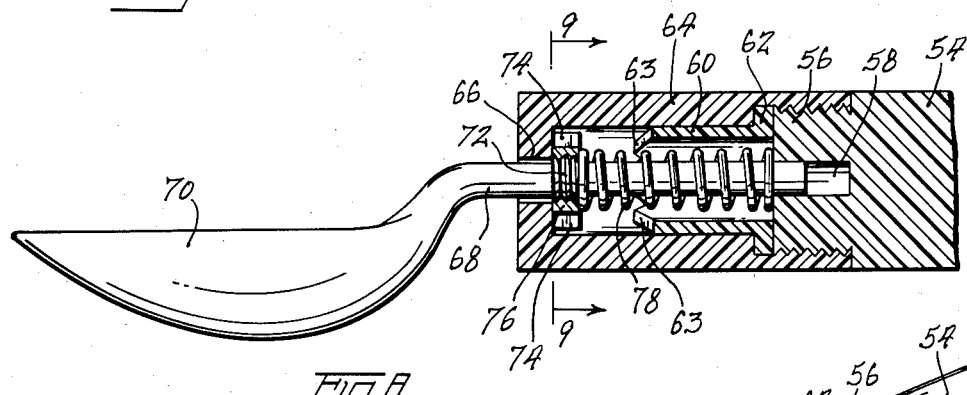
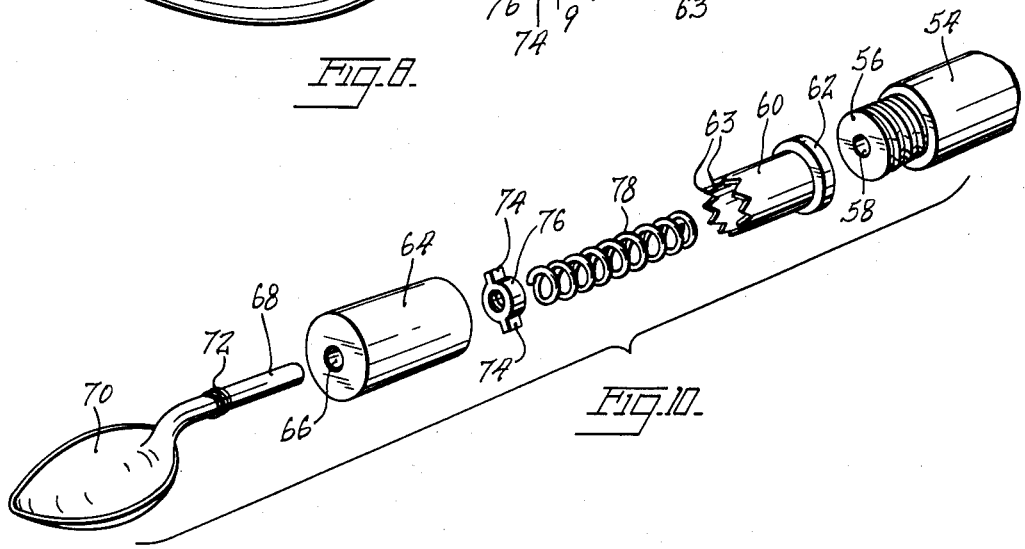
INVENTOR.
EFRAIM MARGOLIN
BY
ATTORNEY

United States Patent Office 2,741,027
Patented Apr. 10, 1956

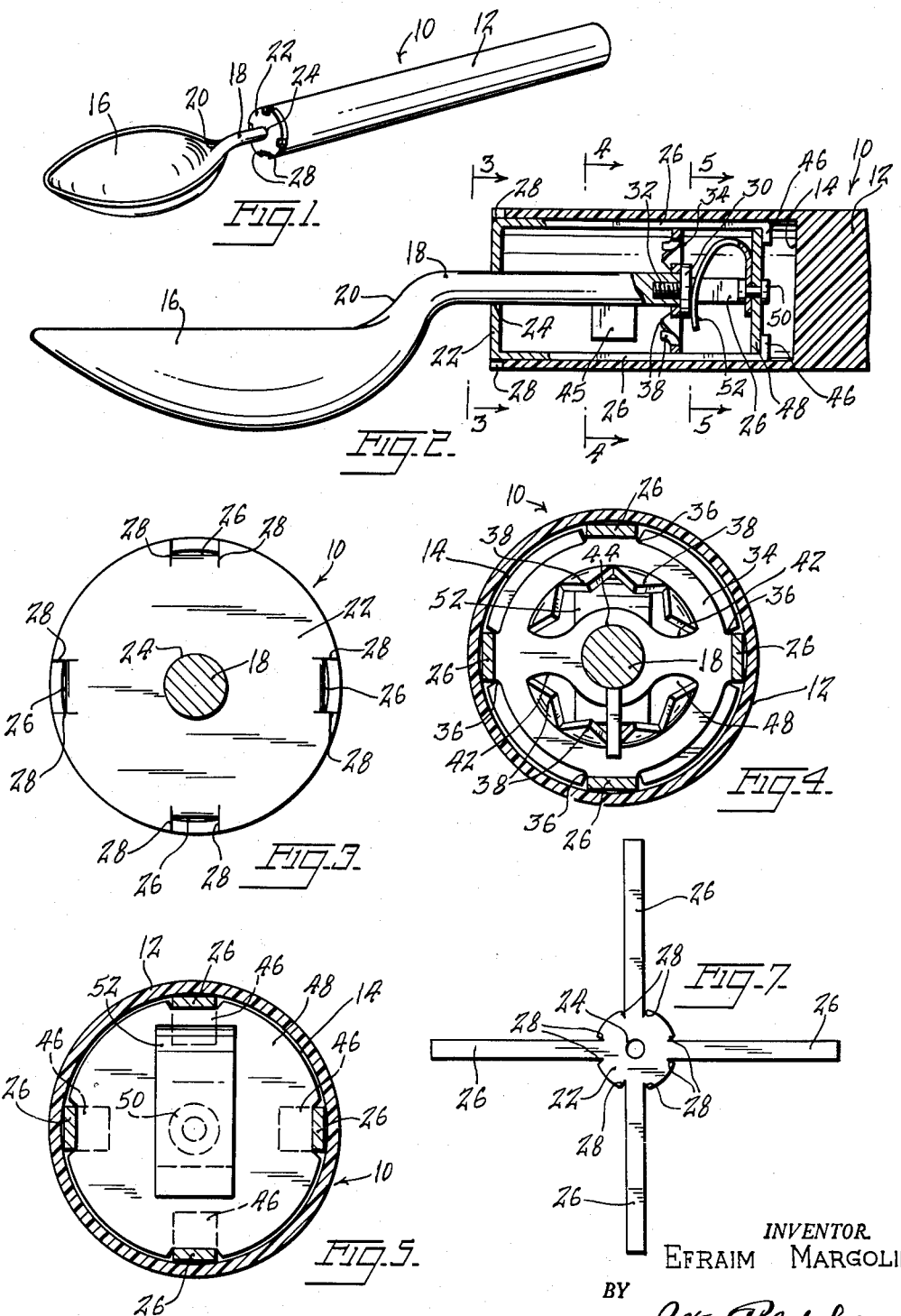

2,741,027

INFANTS' SPOONS

Efraim Margolin, New York, N. Y.

Application September 28, 1953, Serial No. 382,723

4 Claims. (Cl. 30—324)

This invention relates to a spoon particularly designed for use by infants, during the time when they are being trained in the use of spoons, forks, and other eating implements.

A small child, due to unfamiliarity with spoons and related implements, and due further to a lack of dexterity resulting from his tender age, finds considerable difficulty in using said implements, it being particularly hard for the infant to hold the spoon in a manner that will be effective to prevent spilling of the food therefrom. The child experiences difficulty in holding the spoon bowl in an untilted position first, while picking up food therein, and second, while transferring the spoon from his plate to his mouth.

The present invention has as its main object the provision of a spoon that will be particularly adapted to prevent tilting of the spoon bowl in both of the circumstances noted above. To this end, the invention, summarized briefly, includes a spoon bowl that will be rotatable within its associated handle, with the bowl having a center of gravity so located as to cause the spoon bowl to naturally assume an untilted position while the spoon is being moved from plate to mouth or is being returned to the plate. Means is embodied in the construction that will be effective to lock the spoon bowl in this position responsive to the normal pressure exerted thereupon lengthwise of the spoon when the child is forcing the spoon into the food. The locking action occurs only during this particular time, it being noted that it is at this time that the infant finds it especially difficult to maintain the spoon bowl in an untilted position.

A further object of the invention is to provide a spoon that will have the benefits noted above, but which will nevertheless be designed for easy cleaning and for maintenance in a completely sanitary condition.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of a spoon formed in accordance with the invention.

Fig. 2 is an enlarged, fragmentary longitudinal sectional view.

Fig. 3 is a transverse sectional view, the scale being further enlarged, on line 3—3 of Fig. 2.

Fig. 4 is a transverse sectional view on line 4—4 of Fig. 2.

Fig. 5 is a transverse sectional view on line 5—5 of Fig. 2.

Fig. 6 is a plan view of a blank from which is formed a toothed locking disk provided in the spoon.

Fig. 7 is a plan view of a blank from which is formed a cap plate.

Fig. 8 is a view similar to Fig. 2 showing a modified form.

Fig. 9 is an enlarged transverse sectional view on line 9—9 of Fig. 8.

Fig. 10 is a exploded perspective view, portions being broken away, of the modification shown in Fig. 8.

In the construction shown in Figs. 1–7, the spoon has been designated generally at 10 and includes a handle 12 which can be of any desired shape, said handle being shown as cylindrical in the illustrated example of the invention. Preferably the handle 12 is formed of plastic material, and in one end of the handle there is provided an axial recess 14.

The bowl of the spoon has been designated 16 and is integral with a straight shank 18, the bowl being offset downwardly from the shank as at 20 to give the same a low center of gravity. The spoon will thus tend to rotate about an axis defined by the shank thereof, to a position in which it will be properly leveled and held against transverse tilting.

The shank 18 is extended into the recess 14, through a cap plate 22 having a center opening 24 in which the shank is rotatable. The cap plate can be formed from a blank shown in Fig. 7 having a circular center portion integral with elongated, radially extending arms 26 uniformly spaced circumferentially thereof. Short, radial slits 28 are extended inwardly from the periphery of said center portion, in line with the longitudinal edges of the arms, and it will be seen that from a blank of thin sheet metal formed as shown in Fig. 7, one can shape a cap assembly as shown in Fig. 2. The finally shaped assembly includes a flat cap plate 22 having a diameter equal to that of the spoon handle 12 and engaged against the recessed end of the handle to close the recess. The cap assembly further includes elongated arms 26 extending in parallelism with the shank 18, in contact with the wall of the recess. The arms 26 are provided by bending the radial members of Fig. 7 out of the plane of the center portion, to positions normal to said plane.

A screw 30, having a head greater in diameter than the shank 18, is threaded into an axial recess 32 formed in the end of the shank remote from the spoon bowl. The purpose of the screw is to provide an enlargement on the shank that will serve as a stop limiting movement of the shank to the left in Fig. 2. The enlargement can be provided by some means other than a screw, the illustrated construction being shown merely by way of disclosing one type of enlargement on the shank, that will permit assembly of the shank with the cap plate 22 by extension of the shank through the cap plate opening 24, while still providing an enlargement on the shank.

Within the recess 14, and embraced by the several arms 26, is a locking disk 34. This can also be formed from a thin sheet metal blank, shown to advantage in Fig. 6. The blank is formed with equidistantly spaced, short, radial projections 36, corresponding in number and spacing to the arms 26. The projections are soldered or otherwise fixedly secured to intermediate portions of the arms 26, to permanently assemble the locking disk with the cap plate and with said arms. The locking disk, in this connection, is further formed with teeth 38, disposed in diametrically opposite series at opposite sides of a circularly widened center part 40 of a diametrically extended cross bar 42, said center part having an opening 44 through which the shank 18 extends.

In shaping the locking disk from a blank formed as shown in Fig. 6, one would merely bend the teeth 38 outwardly from the plane of the disk, to positions as shown in Fig. 2, wherein it is seen that the teeth are all extended in the direction of the cap plate 22. Thereafter, the disk is fixedly secured to the arms 26, and the shank 18 is extended through the openings 24, 44, said shank being both rotatable and shiftable in the direction of its length within said openings.

After the shank has been extended through the openings and the screw 30 threaded into the recess 32, a radially extending locking lug 45 is soldered or otherwise fixedly attached to the shank in the space between cap plate 22 and the locking disk. When the enlargement defined by the screw head is engaged against the locking disk as shown in Fig. 2, the locking lug will be spaced away from the teeth 38, this being the unlocked position of the spoon bowl.

To complete the assembly of the device, the free ends of arms 26 are turned inwardly as at 46 into engagement with the marginal portion of a spring support plate 48 of circular shape, that is disposed near the inner end of the recess. Plate 48 has a center opening through which extends a rivet 50. Rivet 50 is used to anchor one end of a U-shaped leaf spring 52 to the plate 48.

The spring is held under tension between plate 48 and the enlargement 30, and will therefore be effective to hold the plate 48 against the inwardly turned extensions 46 of the spring arms. Further, the spring will normally urge the shank 18 to the left in Fig. 2, to the unlocked position thereof. In this position of the shank, the spoon bowl is rotatable relative to the handle, thus to permit the spoon bowl to gravitate to the proper, untilted position thereof while being moved to or from the mouth. It should be noted that the tension of the spring is just enough to normally retain the spoon bowl in its unlocked position, and is not sufficient to prevent free gravitational movement of the spoon bowl to its level, untilted position.

In use of the spoon, the infant will tend, when extending the bowl into the food, to exert pressure in the direction of the spoon bowl, along lines extending longitudinally of the spoon. As a result, the mass of food will set up a counterpressure or resistance to movement of the spoon into said mass. This will cause the shank of the spoon to telescope within the spoon handle, against the opposing action of the spring. The spring will be flexed inwardly, as a result, with the locking lug ultimately engaging between adjacent teeth 38 of the locking disk. The engagement of the lug between said adjacent teeth will cause the spoon bowl to be locked against rotation relative to the spoon handle, and thus, the infant will be enabled to pick up a quantity of food in the spoon bowl without danger of the bowl tilting laterally in either direction. The locking action, in other words, takes place at the precise moment when there is a particularly great tendency on the part of the spoon bowl to tilt laterally, during the actual step of filling the same with food. As soon as the food is in the spoon bowl and the spoon is lifted, the shank will return under pressure of the spring to its normal, unlocked position. However, the bowl will still not tilt laterally, since it will gravitate whenever unlocked to a level, untilted position as previously discussed herein.

The construction illustrated and described is adapted for facilitating cleaning of the spoon and maintenance of the same in a desirably sanitary condition between uses thereof. The bowl, shank, cap assembly, locking means, and spring means are all preassembled as a unit, and are removable as such from the recess of the spoon handle when the spoon is to be washed after use thereof by the infant. It is merely necessary that the preassembled parts be withdrawn by exertion of axial pull thereupon. The washing of the removed unit, and of the spoon handle, can then be readily carried out, the unit being of open-frame design to insure that all parts thereof will be cleaned easily. After the parts have been washed, the unit is reinserted and will be held in place by frictional engagement of the arms 26 against the wall of the recess 14.

Referring now to Figs. 8–10, there is here shown a construction wherein greater use of plastic materials is made. It may be noted, before describing the modified structure illustrated in Figs. 8–10, that in the first form of the invention, these parts of the device that are made of metal would be made of a non-corrosive metal material, such as stainless steel, aluminum, or the like.

In the modified form of the invention, a plastic handle 54 is formed at one end with a reduced, threaded, axial extension 56. In the extension 56 there is formed a socket 58 also disposed axially of the handle.

A plastic locking tube 60 is integrally formed at one end with a circumferential shoulder 62 the outer diameter of which substantially equals the diameter of the extension 56. At its other end, the tube 60 is formed with a circumferential series of teeth 63.

A cup-shaped plastic cap 64 is closed at one end, said end having a small center opening 66. At its other end the cap has a threaded skirt engageable with the thread of the handle extension, as shown in Fig. 8. The skirt of the cap is formed with a greater internal diameter than the main body of the cap and thus, there is defined in the cap an internal shoulder against which is engageable the shoulder 62 of the tube 64. As a result, when the cap is threaded onto the extension, the tube will be fixedly locked in place therebetween, in the position shown in Fig. 8.

A shank 68 of metal material is integral at one end with a downwardly offset spoon bowl 70, and intermediate its ends, has a short series of threads 72. The shank can be extended through the opening 66 during assembly of the device, and after being so extended, is engaged by a locking lug member 74 having a threaded sleeve 76, that receives the shank and is engaged by the threads 72 of the shank. Lug member 74 is extended diametrically of and within the cap 64, in position to engage between adjacent teeth located at diametrically opposite points upon the tube 60.

A spring 78 is coiled about the shank 68, and is held under compression between the lug member and the extension 56. Spring 78 normally urges the shank to the left in Fig. 8, to maintain the spoon bowl in a normally unlocked position in which it will be free to rotate within the cap to a balanced, untilted position during movement thereof between the plate of food and the child's mouth.

In assembling the device shown in Figs. 8–10, one would first extend the shank of the spoon through the opening 66 of the cap, and thread the locking member 74 onto said shank. Then, the spring is circumposed about the shank within the cap, and the tube 60 is applied by insertion thereof within the cap about the spring. Thereafter, the cap is threaded onto the extension 56, and the spoon is ready for use.

As in the first form of the invention, the spring is selected of a strength that will be effective for normally disposing the parts in an unlocked position, while still permitting free rotational movement of the spoon bowl. In use, the spring will, of course, be compressed when resistance to insertion of the spoon bowl into the mass of food is encountered. This will cause the parts to shift to locked position to hold the spoon bowl fixedly to the handle momentarily, during filling of the same. Thereafter, as the spoon is lifted, the parts again will be unlocked by expansion of the spring.

As in the first form of the invention, the modified construction is particularly adapted to facilitate washing of the spoon after use. One need only unthread the cap from the spoon handle, to expose all the inner parts for washing purposes. Thereafter, the parts are readily reassembled in a few moments, with the shank end aligning with and extending into the socket 58 of the extension in the assembled condition of the parts.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A spoon consisting of a bowl with an extension therefrom constituting a shank, a cylindrical handle having a hollow end portion, a closure plate enclosing the hollow end portion of the handle, said closure plate having a central opening, said shank extending loosely through the opening in said plate into the hollow end portion of the handle, said shank having a normal outermost position whereby said shank and bowl may rotate and having an innermost position whereby said shank and bowl are held against rotation, and means in the hollow end portion of the handle for urging said shank to outermost position.

2. A spoon consisting of a bowl with an extension therefrom constituting a shank, a cylindrical handle having a hollow end portion, a closure plate enclosing the hollow end portion of the handle, said closure plate having a central opening, said shank extending loosely through the opening in said plate into the hollow end portion of the handle, said shank having a normal outermost position whereby said shank and bowl may rotate and having an innermost position whereby said shank and bowl are held against rotation, and means in the hollow end portion of the handle for urging said shank to outermost position, said latter means consisting of an enlarged head element on the inner extremity of the shank, a disc member secured in the hollow end portion of the handle adjacent the inner end thereof, and an arched spring having one end fixed to said disc and having its other end impinging against the enlarged head element on the shank for urging said shank outwardly.

3. A spoon consisting of a bowl with an extension therefrom constituting a shank, a cylindrical handle having a hollow end portion, a closure plate enclosing the hollow end portion of the handle, said closure plate having a central opening, said shank extending loosely through the opening in said plate into the hollow end portion of the handle, said shank having a normal outermost position whereby said shank and bowl may rotate and having an innermost position whereby said shank and bowl are held against rotation, means in the hollow end portion of the handle for urging said shank to outermost position, and means in the hollow end portion for holding said shank and bowl against rotation, when pressure is exerted upon the bowl consisting of a lug on the shank adjacent its inner end and a disc-shaped member disposed across the space in the hollow end portion, said disc member having spaced fingers in arcuate formation disposed in the path of movement of the lug on the shank and adapted to engage said lug for releasably holding the shank against rotation.

4. A spoon consisting of a bowl with an extension therefrom constituting a shank, a cylindrical handle having a hollow end portion, a closure plate enclosing the hollow end portion of the handle, said closure plate having a central opening, said shank extending loosely through the opening in said plate into the hollow end portion of the handle, said shank having a normal outermost position whereby said shank and bowl may rotate and having an innermost position whereby said shank and bowl are held against rotation, means in the hollow end portion of the handle for urging said shank to outermost position, and means in the hollow end portion for holding said shank and bowl against rotation, when pressure is exerted upon the bowl, said means for urging the shank outermost consisting of an enlarged head element on the inner extremity of the shank, a disc member secured in the hollow end portion of the handle adjacent the inner end thereof, and an arched spring having one end fixed to said disc and having its other end impinging against the enlarged head element on the shank for urging said shank outwardly, said means for holding the shank and bowl against rotation consisting of a lug on the shank adjacent its inner end and a disc-shaped member disposed across the space in the hollow end portion, said disc shaped member having spaced fingers in arcuate formation disposed in the path of movement of the lug on the shank and adapted to engage said lug for releasably holding the shank against rotation.

References Cited in the file of this patent

UNITED STATES PATENTS 2,636,266    Sweet _____ Apr. 28, 1953